United States Patent [19]

Li

[11] 4,374,815

[45] Feb. 22, 1983

[54] PHOSPHONITRILIC CHLORIDE POLYMERS

[75] Inventor: Hsueh M. Li, Baton Rouge, La.

[73] Assignee: Ethyl Corporation, Richmond, Va.

[21] Appl. No.: 314,522

[22] Filed: Oct. 26, 1981

[51] Int. Cl.$^3$ ............................................. C01B 25/10
[52] U.S. Cl. .................................................. 423/300
[58] Field of Search ........................................ 423/300

[56] References Cited

U.S. PATENT DOCUMENTS

| | | | |
|---|---|---|---|
| 3,443,913 | 5/1969 | Bieniek et al. | 528/168 |
| 3,545,942 | 12/1970 | Rice et al. | 423/300 |
| 4,005,171 | 1/1977 | Reynard et al. | 423/300 |
| 4,065,546 | 12/1977 | Kao | 423/300 |

FOREIGN PATENT DOCUMENTS

| | | |
|---|---|---|
| 55-25475 | 1/1980 | Japan . |
| 55-27344 | 2/1980 | Japan . |
| 55-43174 | 3/1980 | Japan . |
| 55-50027 | 4/1980 | Japan . |
| 55-56129 | 4/1980 | Japan . |
| 55-56130 | 4/1980 | Japan . |
| 55-60528 | 5/1980 | Japan . |
| 55-65228 | 5/1980 | Japan . |
| 1016642 | 1/1966 | United Kingdom ................ 423/300 |

OTHER PUBLICATIONS

Lund et al., J. Chem. Soc. (1960), 2542–2547.
Moran, J. Inorg. Nucl. Chem. 30, 1405–1413, (1968).
G. Allen et al., Polymer 11, 31–43, (1970).
Maselli et al., *Phosphonitrilic Laminating Resins*, Air Force Materials Laboratory, Technical Report AFML-65-314, Wright-Patterson Air Force Base, Ohio (Jun., 1965).

*Primary Examiner*—O. R. Vertiz
*Assistant Examiner*—Wayne A. Langel
*Attorney, Agent, or Firm*—Donald L. Johnson; John F. Sieberth

[57] ABSTRACT

Linear phosphonitrilic chloride polymers are produced from linear phosphonitrilic chloride oligomers by means of a two-step process. In the first step a mixture of linear phosphonitrilic chloride oligomer having an average degree of polymerization of at least 4 is heated with an excess of ammonia or ammonium chloride. Cyclic phosphonitrilic chloride oligomer formed during the course of the first step is removed from the reaction mixture. After the removal of the cyclic oligomer the reaction mixture is subjected to the second step which involves heating the mixture in an inert liquid solvent (optionally in the presence of ammonia or ammonium chloride) whereby the molecular weight of the linear phosphonitrilic chloride polymer is increased.

27 Claims, No Drawings

PHOSPHONITRILIC CHLORIDE POLYMERS

TECHNICAL FIELD

This invention relates to a process for producing linear phosphonitrilic chloride polymers. More particularly this invention relates to a process in which such polymers are produced from linear phosphonitrilic chloride oligomers of lower molecular weight.

BACKGROUND

The customary method for the preparation of linear phosphonitrilic chloride polymers involves ring-opening polymerization of phosphonitrilic chloride trimer. Although workable, this method suffers from the fact that for satisfactory results to be achieved, highly pure cyclic phosphonitrilic chloride trimer must be used as the monomer. Such material is difficult and expensive to prepare.

Heretofore some work has been devoted to forming phosphonitrilic chloride polymers from lower molecular weight phosphonitrilic chloride oligomers. For example in J. Chem. Soc. 1960, 2542-7, Lund et al report an experiment in which a linear phosphonitrilic chloride oligomer of the formula $(PNCl_2)_{11}PCl_{4.2}$ was heated with ammonium chloride in sym-tetrachloroethane under reflux. Polymerization occurred after 5.5 hours, at which time the amount of hydrogen chloride evolved corresponded to the composition $(PNCl_2)_{10.6}PCl_5$. The rubbery product was extracted with light petroleum giving a significant quantity of a dark oil containing 10.5 percent $PNCl_2$ trimer, the remainder of the oil consisting of cyclic polymers higher than the heptamer.

Moran in J. Inorg. Nucl. Chem. 30. 1405-13 (1968) investigated the thermal polymerization of the linear compound $[Cl(PCl_2=N)_3PCl_3]PCl_6$ in evacuated sealed tubes at 300° C. for 5 hours and at 350° C. for 5 hours. The phosphorus NMR spectrum of both samples indicated that polymers of other chain lengths were formed. The results in the 300° C. case suggested to Moran that polymerization to the longer chain length compound $[Cl(PCl_2=N)_6PCl_3]PCl_6$ probably occurred. The NMR spectrum of the sample heated at 350° C. indicated to Moran that polymers of both longer and shorter chain lengths were formed.

G. Allen et al in Polymer 11, 31-43 (1970) report attempts to prepare linear $PNCl_2$ polymer by reacting $PCl_5$ with ammonium chloride in ortho-dichlorobenzene, the ammonium chloride being introduced by stepwise addition to the reaction mixture. They were in hopes that the following reactions would occur:

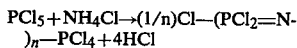

$PCl_5 + NH_4Cl \rightarrow (1/n)Cl-(PCl_2=N-)_n-PCl_4 + 4HCl$ (a)

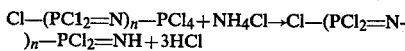

$Cl-(PCl_2=N)_n-PCl_4 + NH_4Cl \rightarrow Cl-(PCl_2=N-)_n-PCl_2=NH + 3HCl$ (b)

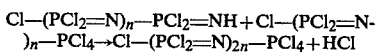

$Cl-(PCl_2=N)_n-PCl_2=NH + Cl-(PCl_2=N-)_n-PCl_4 \rightarrow Cl-(PCl_2=N)_{2n}-PCl_4 + HCl$ (c)

However they obtained very low molecular weight polymer (intrinsic viscosity of trifluoroethoxy derivative was below 0.05 deciliters per gram). When they attempted to increase the molecular weight of their polymer product by reacting it with ammonium chloride in ortho-dichlorobenzene solvent, they obtained a crosslinked material.

U.S. Pat. No. 3,443,913 discloses a method wherein linear $(PNCl_2)_{3-15}$ oligomers are heated at 240°-260° C. to produce linear phosphonitrilic chloride polymers having a molecular weight between 3,000 and 10,000. However, this process involves heating for long periods of time, the endpoint of the polymerization occurring about 40 to 60 hours after heating has been initiated. The product obtained via this process is reported to be a dark viscous oil. See also James M. Maselli, Thomas Bieniek and Rip G. Rice (W. R. Grace and Company), *Phosphonitrilic Laminating Resins*, Air Force Materials Laboratory, Technical Report AFML-65-314; Wright-Patterson Air Force Base, Ohio: June, 1965, pages 18-19, which describes this same process. At page 47 of this report Maselli et al describe an experiment therein oligomeric phosphonitrilic chloride was placed in a resin kettle fitted with a nitrogen inlet, stirrer and exhaust tube condenser. The kettle was heated to $250° \pm 10°$ C. for a total of 55 hours while the polymeric $(PNCl_2)_n$ was stirred under a blanket of dry nitrogen. Samples of the reaction material were taken at selected intervals of time during the heating for molecular weight determination. The resulting data were as follow:

| Time (Hours) | Molecular Weight (VPO) |
|---|---|
| Start | 700 |
| 10 | 1200 |
| 40 | 3200 |
| 55 | 6900 |

According to the authors, when heating was continued for an additional 8 hours at temperatures in excess of 250° C., the viscous, soluble oil (molecular weight 6900) was converted to the familiar insoluble "inorganic rubber".

In U.S. Pat. No. 3,545,942 which in part discloses a method of thermally stabilizing phosphonitrilic chloride oligomers by heating them in an inert atmosphere for 2 to 8 hours at 240° to 260° C., Rip G. Rice et al indicate that prolonged heating of the oligomer can result in the formation of an "inorganic rubber". A decade earlier Lund et al (op. cit.) referred to an experiment in which heating of a linear phosphonitrilic chloride oligomer in tetrachloroethane solution resulted in polymerization after 29 hours.

In prior copending applications Ser. No. 956,227 filed Oct. 30, 1978 and Ser. No. 176,926 filed Aug. 11, 1980, (both subsequently abandoned) a distinctly superior thermal polymerization process is described wherein linear phosphonitrilic chloride oligomer is heated to 275° to 350° C. for 1 to 20 hours while concurrently withdrawing phosphorus pentachloride vapor from the liquid phase. A similar procedure is described in Japanese Laid-Open Application (Kokai) 55-27,344 published Feb. 27, 1980. In this case a linear phosphazene oligomer usually having a degree of polymerization of 3 to 15 is heated under reduced pressure (usually less than 20 mm Hg) to produce linear polymers. Heating for five hours or more at 100°-300° C. is suggested. Unfortunately, phosphorus pentachloride vapor is extremely corrosive at elevated temperatures—it tends to rapidly corrode even the most expensive corrosion-resistant metals used in the manufacture of corrosion-resistant chemical reactors.

Japanese Kokai No. 55-56,130 published Apr. 24, 1980 describes a method for producing phosphazene polymers in which a linear phosphazene oligomer is heated in the presence or absence of a solvent at 50° to 300° C. using a Lewis base such as urea, thiourea, polyurea or polythiourea as a catalyst for increasing molecular weight.

Japanese Kokai No. 55-56,129 published Apr. 24, 1980 discloses a process in which ammonium chloride is used as the catalyst in a reaction involving heating phosphazene oligomer at 150°–350° C. in a closed system. For example, a solution of linear and cyclic phosphonitrilic chloride oligomers in dichlorobenzene containing a small amount of ammonium chloride catalyst was heated at 255° C. for 10 hours in a sealed tube to form the polymer.

Japanese Kokai No. 55-25,475 published Jan. 23, 1980 describes formation of phosphazene polymers by reacting a phosphorus source (e.g., P+Cl$_2$; PCl$_3$+Cl$_2$; PCl$_5$) with a nitrogen source (e.g., NH$_3$; NH$_4$Cl) in any of three reaction systems:

(1) In a solvent that does not dissolve the phosphazene polymers, such as an aliphatic hydrocarbon or alicyclic hydrocarbon that is resistant to halogenation.

(2) In an undiluted (concentrated) reaction system having a small quantity (250 ml or less per mole of P source reactant) of a solvent capable of dissolving the phosphazene polymers that is resistant to halogenation, such as a halogenated aromatic hydrocarbon.

(3) In a phosphazene oligomer as the solvent.

Japanese Kokai No. 55-65,228 published May 16, 1980 describes a method for producing phosphazene polymers in which a mixture of linear phosphazene oligomer, which has been stabilized with phosphorus pentachloride, hydrogen chloride or a metal halide, and cyclic phosphazene oligomer, is heated at 150° to 350° C. in a closed system having a solvent or non-solvent in the presence of a Lewis base catalyst. Urea, Thiourea, polyurea, and polythiourea are examples of Lewis base catalysts used.

Japanese Kokai No. 55-50,027 published Apr. 11, 1980 discloses performing thermal ring-opening polymerization of cyclic phosphazene oligomers in the presence of linear phosphazenes stabilized with a metal halide, notably the linear oligomers formed as by-products when synthesizing the cyclic oligomers with metals or metal salts as catalysts. Such linear oligomers are indicated to have a degree of polymerization in the range of 2 to 100.

Japanese Kokai No. 55-60,528 published May 7, 1980 discloses a process wherein phosphazene polymers are formed by heating phosphazene oligomer at 150° to 350° C. in a closed system in the presence of a Lewis base such as urea, thiourea, polyurea or polythiourea. The phosphazene oligomer is a mixture of linear phosphazene oligomers (5 to 95 weight percent; stabilized with phosphorus pentahalide or hydrogen halide) and cyclic phosphazene oligomer.

Japanese Kokai No. 55-43174 published Mar. 26, 1980 describes a process for producing phosphazene polymers in which cyclic phosphazene oligomers are subjected to thermal ring opening polymerization in the presence of linear phosphazenes which have been stabilized by phosphorus pentahalides or hydrogen halides.

Despite the variety of approaches studied, no completely satisfactory method for producing linear phosphonitrilic chloride polymers from linear phosphonitrilic chloride oligomers has been reported to date.

Among the unsolved problems or shortcomings plaguing the prior methods noted above are the following:

formation of polymers of molecular weight lower than desired formation of impure or cross-linked polymers having undesired properties or characteristics requirement for long reaction or polymerization periods with consequent low reactor productivity formation of highly corrosive coproducts such as phosphorus pentachloride at extremely high temperatures which necessitates use of very expensive corrosion-resistant reactors necessity of solvent extraction operations to remove cyclic oligomeric by-products and other time-consuming, difficult and costly separation procedures and their attendant problems formation of the desired polymer in yields lower than desired need for very high reaction or polymerization temperatures.

A welcome contribution to the art would be the provision of a process avoiding these difficulties and shortcomings.

The Invention

In accordance with this invention a two-stage process is provided whereby linear phosphonitrilic chloride polymers can be readily produced from linear phosphonitrilic chloride oligomers of lower molecular weight. The problems, difficulties and shortcomings of prior procedures noted above are eliminated or at least significantly reduced. Polymers of desired molecular weights (e.g., average degrees of polymerization in the range of 20 to 1000 or more) can be formed in good yield and high purity at relatively moderate temperatures in relatively short reaction periods. The highly corrosive phosphorus pentachloride is not formed and the process is capable of being performed in relatively simple and economical reaction equipment. Complex separation procedures are not required.

To achieve these and other attendant technical and economic advantages of this invention, use is made of a process which comprises (a) heating a mixture of linear phosphonitrilic chloride oligomer and an excess of ammonia or ammonium chloride at a temperature in the range of about 130° to about 250° C. while concurrently removing hydrogen chloride and concurrently or subsequently removing cyclic phosphonitrilic chloride oligomer from the heated reaction mixture; and (b) after formation of cyclic phosphonitrilic chloride oligomer has essentially ceased and after removal of the oligomer, heating the reaction mixture in an inert liquid solvent, optionally in the presence of ammonia or ammonium chloride, at a temperature in the range of about 130° to about 250° C. to increase the molecular weight of the dissolved linear phosphonitrilic chloride polymer.

Preferred conditions for use in the above process involve conducting step (a) at a temperature in the range of about 140° to about 230° C. and step (b) at a temperature of about 140° to about 240° C. A particularly preferred embodiment involves use of temperatures in the range of 150° to 210° C. in (a) and 170° to 240° C. in (b).

An important facet of this invention is to employ in (a) a linear phosphonitrilic chloride oligomer having an average degree of polymerization of at least 4. In other words, the oligomer raw material for the process—normally a mixture of oligomer molecules of somewhat differing molecular weights—should have a number average degree of polymerization of 4 or more. Thus the oligomer used in (a) may be represented by the formula:

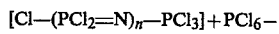

[Cl—(PCl$_2$=N)$_n$—PCl$_3$]+PCl$_6$— wherein n is a numeral which averages at least 4, e.g., a numeral in the range of 4 to 15 or more.

In a further preferred embodiment the linear oligomer used in (a) contains less than 35 mol percent of linear oligomer molecules having a degree of polymerization of 3 or less. By employing oligomers meeting this criterion the amount of competing side reactions such as cyclic oligomer formation is minimized.

Methods for the preparation of linear oligomers as above described are well known and reported in the literature. One typical procedure involves refluxing a mixture of phosphorus pentachloride and ammonium chloride in a suitable solvent for a suitably long reaction period, distilling off the solvent under reduced pressure and then extracting the oligomeric product with a suitable extraction solvent such as hexane to remove residual amounts of the reaction solvent and cyclic oligomers formed during the reaction. One such procedure successfully used in practice involves forming a mixture of about 6.0 kg of phosphorus pentachloride, about 1.2 kg of ammonium chloride and 3 liters of monochlorobenzene. Such mixture is refluxed in a 12-liter reactor at atmospheric pressure for 4 days at about 131° C. Hydrogen chloride evolved during the reaction is absorbed in aqueous scrubbers. At the end of this time the chlorobenzene solvent is stripped off under reduced pressure at 60° to 80° C. Then the product is extracted with hexane in order to remove residual amounts of chlorobenzene solvent and cyclic oligomers. Such a product is then ready for use in practicing the process of this invention. Another very useful method for preparing the linear oligomers is described in U.S. Pat. No. 4,198,381. the disclosure of which is incorporated herein.

As noted above the nitrogen source as used in step (a) is preferably ammonia or ammonium chloride, or both. The quantities in which the nitrogen source material is used are not critical provided that a sufficient amount is introduced into the reaction mixture to provide an excess over the stoichiometric amount relative to the quantity of linear oligomer being reacted. Preferably, the entire amount of ammonia or ammonium chloride being used in the reaction is charged into the reaction vessel at the start of the reaction. However, the ammonia or ammonium chloride can be introduced into the reaction mixture on an incremental or continuous basis during the course of all or a portion of the reaction of step (a).

On heating the nitrogen source material with the linear phosphonitrilic chloride oligomer polymerization takes place along with the formation of cyclic phosphonitrilic chloride oligomer. An important aspect of this invention is the removal of this cyclic oligomer from the reaction mixture before performing the further polymerization reaction of step (b) giving rise to the formation of the higher molecular weight linear phosphonitrilic chloride polymer. To effect this removal of cyclic oligomer in (a) use may be made of several different process techniques. For example, all or a portion of (a) may be performed in a boiling inert organic liquid whereby the liquid vapors drive off the cyclic phosphonitrilic chloride oligomer. Another method is to perform all or a portion of (a) at a reduced pressure so that at the temperature employed the cyclic phosphonitrilic chloride oligomer is distilled from the reaction mixture. Still another way of effecting the removal of the cyclic phosphonitrilic chloride oligomer is to sweep the heated reaction mixture of (a) with an inert vapor or gas. In this way the entrained cyclic oligomer is carried away from the reaction zone. In all cases it is desirable that the reaction mixture be suitably agitated both during the reaction and during the removal of the cyclic oligomer.

Step (a) may be thus performed in the presence or absence of an inert organic liquid or diluent. In most cases it is preferable to conduct (a) in bulk as this reduces the size requirements for the reaction vessels.

When employing solvents in step (a) use may be made of such materials as saturated aliphatic hydrocarbons (e.g., nonanes, decanes, dodecanes, etc.), saturated cycloaliphatic hydrocarbons (e.g., o-dimethylcyclohexane, etc.), aromatic hydrocarbons (e.g, xylenes, trimethylbenzenes, ethylbenzene, methylnaphthalenes, etc.), chlorinated hydrocarbons (e.g., 1,4-dichlorobutane, tetrachloroethane, chlorobenzene, dichlorobenzenes, etc.), and other similar inert materials.

Reaction times used in step (a) should be long enough for the formation of cyclic phosphonitrilic chloride oligomer to essentially cease at the reaction temperature employed. In general reaction times in (a) ranging from about 4 to about 12 hours will usually be sufficient.

Once the formation of cyclic phosphonitrilic chloride has essentially ceased and after the cyclic oligomer has been removed from the reaction mixture formed in (a), step (b) is then performed. This involves heating the resultant reaction mixture in an inert liquid solvent at a suitably elevated temperature, optionally in the presence of ammonia or ammonium chloride, for a time period sufficient to increase the molecular weight of the linear phosphonitrilic chloride polymer. Generally speaking, the longer the reaction time the higher the molecular weight of the resultant linear phosphonitrilic chloride polymer. Accordingly, the reaction time for step (b) may be varied within relatively wide limits although ordinarily times in the range of 4 to about 24 hours will usually be used. As noted, at least a portion of step (b) may be performed in the presence of ammonia or ammonium chloride (or both) and such material(s) may be introduced into the reaction mixture at the start and/or during the course of step (b). Alternatively, such material(s) may constitute residual ammonia or ammonium chloride remaining in the reaction mixture after completion of step (a).

A wide variety of inert solvents may be employed in step (b). These include inert chloroaliphatic, cycloaliphatic, and aromatic solvents of various types. While various cycloalkanes, chloroalkanes and chlorocycloalkanes having appropriate boiling points are thus suitable for this process, it is preferred to use an inert aromatic solvent such as aromatic hydrocarbons and chloroaromatic hydrocarbons having boiling points at least as high as the reaction temperature being used in (b). Preferred solvents of this type include xylenes, methylnaphthalenes, chlorobenzene, dichlorobenzenes, trichlorobenzenes, etc.

If desired, steps (a) and (b) may both be performed in the same solvent.

The amount of solvent used in (b) is preferably regulated so as to keep the reaction mixture in a concentrated solution while avoiding excessive gelation. Thus it is desirable to perform step (b) in a relatively concentrated reaction solution with periodic or continuous addition of solvent to maintain the reaction mixture in a fluid state as the reaction proceeds.

If it is desired to recover the linear phosphonitrilic chloride polymeric product from the reaction solvent used in (b), various techniques are available for use. For example, the solvent may be distilled off using an appropriate combination of reduced pressure and distillation temperature. Alternatively the linear phosphonitrilic chloride polymer may be precipitated from the solvent by the addition of the solution to a suitable non-solvent such as pentane or hexane. These and other similar techniques will be evident to those skilled in the art.

When it is desired to chemically convert the linear phosphonitrilic chloride polymer into another type of phosphazene polymer, subsequent reactions with an appropriate reactant may be effected in the same reaction solvent as used in step (b). Indeed in such cases it is unnecessary to isolate or recover the linear phosphonitrilic chloride polymer formed in step (b) as the ensuing reaction(s) may be effected in the same solution.

Steps (a) and (b) may be conducted in separate reactors. A feature of this invention, however, is the fact that both steps may be performed in the same reaction vessel, provided of course that it is appropriately sized to handle the quantities of material involved in each step. Thus in accordance with a preferred embodiment of this invention, (a) and (b) are conducted in the same reactor. It is further preferred to introduce the solvent of (b) into such reactor upon the completion of (a).

Additional preferred embodiments of this invention involve the following:

1. Employing ammonia as the nitrogen source in (a) and after the formation of cyclic phosphonitrilic chloride oligomer in (a) has essentially ceased, sweeping the heated reaction mixture of (a) with an inert vapor or gas so as to remove cyclic phosphonitrilic chloride oligomer vapor from the reaction mixture.

2. Employing ammonium chloride as the nitrogen source in (a) and removing cyclic phosphonitrilic chloride oligomer as a vapor either during or after its formation in (a) by sweeping the heated reaction mixture of (a) with an inert vapor or gas.

3. Employing ammonia as the nitrogen source in (a) and after the formation of cyclic phosphonitrilic chloride oligomer of (a) has essentially ceased, removing cyclic phosphonitrilic chloride oligomer vapor from the heated reaction mixture of (a) under reduced pressure.

4. Employing ammonium chloride as the nitrogen source in (a) and removing cyclic phosphonitrilic chloride oligomer as a vapor either during or after its formation in (a) by heating the reaction mixture of (a) under reduced pressure.

It is particularly preferred to conduct each of the above four operations in bulk (i.e., in the absence of any added reaction solvent).

The practice and advantages of this invention will be still further apparent from the following illustrative examples which are not to be construed in a limiting sense.

EXAMPLE I

Step (a): To a one liter, five-neck round bottom flask, cradled in a heating mantle and fitted with a mechanical stirrer, a thermometer, a nitrogen inlet tube and a gas/vapor outlet tube were added 250 g of low molecular weight linear phosphonitrilic chloride oligomer having an average degree of polymerization (n in $[Cl-(PCl_2=N)_n-PCl_3]^+PCl_6^-$) falling in the range of 4 to 6 and 25.6 g of ammonium chloride. (The NMR spectrum of this oligomer indicated that about 7 percent of the oligomer had a degree of polymerization of 2 with the balance having a degree of polymerization ranging from 3 to 10.) The mixture was heated at 155°–165° C. for two hours, then the temperature was raised to 200° C. and nitrogen sweeping was started to carry away cyclic phosphonitrilic chloride oligomer formed during the reaction. The temperature was kept at 200°±3° C. for about 4 hours and then at 200°–210° C. for 1¼ hours. During this time several small samples were withdrawn from the reaction mixture for $P^{31}$ NMR analysis to determine the residual content of the cyclic oligomers. The reaction was terminated at the end of the foregoing 1¼ hour period since the analyses indicated that the removal of the cyclic oligomers was essentially complete. The reaction yielded 163.3 g of viscous liquid linear phosphonitrilic chloride polymer. This was dissolved in 138 ml of monochlorobenzene (MCB) yielding 240 ml of a polymer solution.

Step (b): To increase the molecular weight of the polymer formed in step (a), 120 ml of the above phosphonitrilic chloride polymer solution, 70 ml of MCB and 0.9 g of ammonium chloride were introduced into a flask equipped as described in step (a) except that the gas/vapor outlet tube was replaced with a reflux condenser and an HCl outlet adapter and tubing. The mixture was heated at 131°–132° C. for about 4½ hours. During this time the reaction mixture had become more viscous due to the increase in molecular weight of the polymer and thus at that time 30 ml of MCB was added to reduce the viscosity of the reaction mixture. Eighty minutes later an additional 30 ml of MCB was added to thin the reaction mixture and the reaction was temporarily discontinued by turning off the heating system and the stirrer. Next morning the reaction was resumed. To accelerate the reaction, an additional 0.1 g of NH$_4$Cl was added. The temperature of the reaction mixture was raised to 131°–132° C. and kept at this temperature range for 2 hours. The reaction mixture was further thinned with 30 ml of MCB. The reaction was allowed to extend for an additional 30 minutes before being terminated. Since the reaction mixture was still quite viscous, 5 ml of 1-pentanol dissolved in 20 ml of MCB was added to reduce the viscosity of the polymer solution. The volume of the polymer solution was 486 ml and the weight of the phosphonitrilic chloride polymer in the solution was approximately 80 g.

To determine the molecular weight of the phosphonitrilic chloride polymer, a small sample of poly(phenoxy phosphazene) was produced from the above phosphonitrilic chloride polymer. To accomplish this, 102 ml of the above polymer solution was diluted with 100 ml of toluene, the diluted solution was allowed to stand overnight to allow a trace amount of unreacted NH$_4$Cl to settle, and the clear solution was then reacted with 0.32 mole of sodium phenoxide in 200 ml of diglyme for 24 hours at 110° C. In this operation 24.4 g of poly(phenoxy phosphazene) was formed. The intrinsic viscosity of the poly(phenoxy phosphazene) as measured in tetrahydrofuran (THF) at 25° C. was 0.49 dl/g.

EXAMPLE II

Step (a): The apparatus was similar to that described in Step (a) of Example I except that the reactor was a 2 liter, five-neck round bottom flask instead of a 1 liter, five-neck round bottom flask.

A 603 g portion of the same low molecular weight linear phosphonitrilic chloride oligomer as described in Example I and 50 g of $NH_4Cl$ were introduced into the reactor. The mixture was heated at 155°–160° C. for 2⅔ hours, and at 175°–180° C. for 3¼ hours. The nitrogen sweeping was then started and the temperature was raised to and kept at 200°±2° C. for 2½ hours. An additional 8 g of $NH_4Cl$ was added and the reaction was continued for another 1½ hours at 200°–210° C. Use of $P^{31}$ NMR analysis indicated that the removal of the cyclic phosphonitrilic chloride oligomer formed in the reaction was essentially complete and accordingly the reaction was terminated and the contents of the reactor were allowed to cool to about 100° C. 500 ml of o-dichlorobenzene (DCB) was added to dissolve the phosphonitrilic chloride polymer (434.4 g). The volume of the polymer solution was 730 ml.

Step (b): 135 ml of the above phosphonitrilic chloride polymer solution (containing about 80 g of the polymer), 2 g of $NH_4Cl$ and 65 ml of DCB were added into the same reactor used in Step (b) of Example I. The mixture was heated at 170° C. for 5 hours. The reaction medium was very viscous and began to climb up the shaft of the stirrer. The reaction was terminated immediately by turning off the heating and stirring devices. When the temperature of the contents had cooled to about 150° C., 10 ml of 1-hexanol mixed with 100 ml of DCB was added. The stirrer was turned on. In about 20 minutes the very thick honey-like mass had turned into viscous liquid. To reduce further the viscosity of the liquid, an additional 180 ml of DCB was added. The volume of the resultant phosphonitrilic chloride polymer solution was 490 ml. Approximately 24 g of insoluble gel-like material remained in the reactor. The weight of the polymer dissolved in the solvent was approximately 55 g.

Following the same procedure described in Example I, a small sample of poly(phenoxy phosphazene) was prepared for intrinsic viscosity and molecular weight determinations. The intrinsic viscosity of the polymer (THF; 25° C.) was 0.54 dl/g.

EXAMPLE III

This example illustrates the advantage of diluting the reaction mixture during the course of step (b) to prevent gelation as occurred in Example II.

A separate 135 ml portion of the same phosphonitrilic chloride polymer solution as used in Step (b) of Example II, 2 g of $NH_4Cl$ and 65 ml of DCB were heated in the same reactor of Step (b) of Example II at 170° C. for 3⅝ hours. Thereupon 100 ml of DCB was added to thin the reaction medium. The reaction mixture was continuously heated at the same temperature for an additional 2 5/6 hours and diluted with two portions of 100 ml of DCB during this period of time. At the end of a grand total of 6½ hours of reaction at 170° C. the heating system was turned off and 50 ml of DCB was added to reduce the rather viscous polymer solution. When the temperature was at about 155° C., 6 ml of 1-hexanol mixed with 60 ml of DCB was added to further reduce the viscosity of the polymer solution. The reaction yielded 634 ml of the polymer solution containing 79 g of phosphonitrilic chloride polymer. No gel material remained in the reactor.

A small sample of poly(phenoxy phosphazene) was prepared as above. The intrinsic viscosity (THF; 25° C.) was found to be 0.60 dl/g.

EXAMPLE IV

In order to obtain an indication of the relative amounts of linear polymer, cyclic oligomer, and HCl formed in the step (a) procedure, step (a) was conducted while separately trapping the latter two by-products for assay. In particular, a 595 g portion of the same low molecular weight linear phosphonitrilic chloride oligomer as described in Example I and 50 g of $NH_4Cl$ were introduced into the same reactor used in Step (a) of Example II. The mixture was heated at 160° C. for 3 hours, and 170° C. for one hour. Nitrogen sweeping was then started to remove the cyclic phosphonitrilic chloride oligomer formed from the reaction. The temperature was raised to and kept at 180° C. for one hour, at 200°–205° C. for one hour, and finally at 210° C. for 2 hours. The HCl gas generated during the reaction was absorbed in water and the HCl aqueous solution was titrated with standard NaOH solution. The cyclic oligomer as purged from the reaction vessel was trapped in toluene and upon completion of the reaction the toluene was evaporated and the cyclic oligomer residue weighed.

The reaction yielded 416.8 g of linear phosphonitrilic chloride polymer, 137 g of HCl and 20 g of cyclic phosphonitrilic chloride oligomers.

EXAMPLE V

Step (a): The apparatus was similar to that described in Example I except that the reactor was a 3 liter, five-neck round bottom flask instead of a 1 liter, five-neck round bottom flask.

A further 1.349 kg portion of the same low molecular weight linear phosphonitrilic chloride oligomer referred to in Example I and 127 g of $NH_4Cl$ were heated in the above reactor at 160° C. under a nitrogen sweep for 2⅔ hours, at 170°–180° C. for 3 hours, at 190°–200° C. for one hour and 200°–210° C. for one hour and finally at 210°–220° C. for 4 hours. 950 ml of DCB was added to dissolve 918 g of phosphonitrilic chloride polymer product. The volume of the polymer solution was 1,445 ml.

Step (b): The apparatus was similar to that described in Step (b) of Example I except that the reactor was a 5 liter, four-neck round bottom flask.

710 ml of the phosphonitrilic chloride polymer solution from Step (a) of this example, 900 ml of DCB and 12 g of $NH_4Cl$ were heated at 170° C. for 6½ hours. Four 200–250 ml portions of DCB were added stepwise during the last 2½-hour period of the reaction to reduce the viscosity of the reaction medium. When the temperature of the viscous polymer solution was cooled to 135° C., 10 ml of 1-hexanol mixed with 50 ml of DCB was added to further reduce the viscosity of the polymer solution.

The reaction yielded 445 g of linear phosphonitrilic chloride polymer, and 3.5 g of HCl was captured in an aqueous trap. The concentration of the final polymer solution was 0.174 g/ml.

A small sample of poly(phenoxy phosphazene) was then prepared as above from this final phosphonitrilic chloride polymer solution. The intrinsic viscosity (THF; 25° C.) of the phenoxy substituted polymer was 0.61 dl/g.

The linear phosphonitrilic chloride polymers produced in accordance with this invention are useful for a variety of applications. By way of example these linear polymers when of relatively low molecular weight are useful as intermediates in the synthesis of hydraulic fluids, lubricants and flame retardants. In particular the linear phosphonitrilic chloride polymers preferably having average degrees of polymerization in below about 50 may be substituted with aryloxy and/or alkoxy groups to form products useful as hydraulic fluids, lubricants and flame retardants. Methods for effecting such substitution are well known in the art and are described for example in U.S. Pat. No. 3,443,913; U.S. Pat. No. 3,856,712; U.S. Pat. No. 3,883,451; and U.S. Pat. No. 4,055,523. Alternatively aryloxy and alkoxy substituted linear polymers of higher average degrees of polymerization containing ethylenic unsaturation can be compounded and cured by crosslinking to produce elastomers, coatings, adhesives, potting compounds, thermoset plastics and flexible or rigid foams. Note in this connection U.S. Pat. No. 4,264,531.

I claim:

1. A process for producing linear phosphonitrilic chloride polymers from linear phosphonitrilic chloride oligomers of lower molecular weight which comprises:
   (a) heating a mixture of linear phosphonitrilic chloride oligomer having an average degree of polymerization of at least 4 and an excess of ammonia or ammonium chloride at a temperature in the range of about 130° to about 250° C. while concurrently removing hydrogen chloride and concurrently or subsequently removing cyclic phosphonitrilic chloride oligomer from the heated reaction mixture; and
   (b) after the formation of cyclic phosphonitrilic chloride oligomer has essentially ceased and after removal of the oligomer, heating the reaction mixture in an inert liquid solvent at a temperature in the range of about 130° to about 250° C. to increase the molecular weight of the dissolved linear phosphonitrilic chloride polymer.

2. A process according to claim 1 wherein the solvent in (b) is an inert aromatic solvent.

3. A process according to claim 2 wherein the solvent in (b) is a chloroaromatic solvent.

4. A process according to claim 3 wherein the solvent in (b) is chlorobenzene or dichlorobenzene.

5. A process according to claim 4 wherein the solvent is (b) is ortho-dichlorobenzene.

6. A process according to claim 1 wherein (a) and (b) are conducted in the same reactor.

7. A process according to claim 6 wherein the solvent of (b) is introduced into the reactor upon completion of (a).

8. A process according to claim 7 wherein the solvent in (b) is an inert aromatic solvent.

9. A process according to claim 1 wherein ammonia is used in (a) and wherein after the formation of cyclic phosphonitrilic chloride oligomer in (a) has essentially ceased, the cyclic phosphonitrilic chloride oligomer vapor is removed from the reaction mixture by sweeping the heated reaction mixture of (a) with an inert vapor or gas.

10. A process according to claim 9 wherein at least a portion of (a) is conducted in bulk.

11. A process according to claim 1 wherein ammonium chloride is used in (a) and wherein the cyclic phosphonitrilic chloride oligomer vapor is removed from the reaction mixture in (a) by sweeping the heated reaction mixture of (a) with an inert vapor or gas.

12. A process according to claim 11 wherein at least a portion of (a) is conducted in bulk.

13. A process according to claim 1 wherein ammonia is used in (a) and wherein after the formation of cyclic phosphonitrilic chloride oligomer in (a) has essentially ceased, cyclic phosphonitrilic chloride oligomer vapor is removed from the heated reaction mixture of (a) under reduced pressure.

14. A process according to claim 13 wherein (a) is conducted in bulk.

15. A process according to claim 1 wherein ammonium chloride is used in (a) and wherein cyclic phosphonitrilic chloride oligomer vapor is removed from the heated reaction mixture of (a) under reduced pressure.

16. A process according to claim 15 wherein (a) is conducted in bulk.

17. A process according to claim 1 wherein said oligomer is further characterized by containing less than 35 mole percent of linear oligomers having a degree of polymerization of 3 or less.

18. A process according to claim 1 wherein (a) is conducted at a temperature within the range of about 150° to about 210° C. and (b) is conducted at a temperature within the range of about 170° to 240° C.

19. A process according to claim 1 wherein at least a portion of (a) is performed in bulk.

20. A process according to claim 1 wherein ammonia is used in (a).

21. A process according to claim 1 wherein ammonium chloride is used in (a).

22. A process according to claim 1 wherein during at least a portion of (a) the ammonia or ammonium chloride is introduced into the reaction mixture continuously or incrementally.

23. A process according to claim 1 wherein removal of the cyclic phosphonitrilic chloride oligomer vapor in (a) is effected by sweeping the heated reaction mixture with an inert vapor or gas.

24. A process according to claim 1 wherein removal of the cyclic phosphonitrilic chloride oligomer in (a) is effected by reducing the pressure on the heated reaction mixture to below atmospheric pressure.

25. A process according to claim 1 wherein at least a portion of (a) is performed in a boiling inert solvent whereby the solvent vapors drive off cyclic phosphonitrilic chloride oligomer.

26. A process according to claim 1 wherein at least a portion of (b) is performed in the presence of ammonia or ammonium chloride.

27. A process according to claim 1 wherein the amount of solvent present in (b) is regulated to keep the reaction mixture in a concentrated reaction solution while avoiding excessive gelation.

* * * * *